(No Model.)

W. STEVENS.
HATCHWAY GATE.

No. 279,610. Patented June 19, 1883.

Attest:
W. S. Mac Wade

Inventor:
William Stevens
By his atty

UNITED STATES PATENT OFFICE.

WILLIAM STEVENS, OF PHILADELPHIA, PENNSYLVANIA.

HATCHWAY-GATE.

SPECIFICATION forming part of Letters Patent No. 279,610, dated June 19, 1883.

Application filed April 20, 1883. (No model.)

*To all whom it may concern:*

Be it known that I, WILLIAM STEVENS, of the city of Philadelphia, county of Philadelphia, and State of Pennsylvania, have invented an Improvement in Elevator-Gates, of which the following is a specification.

My invention has reference to automatic gates for elevator-hatchways; and it consists in pivoting the gate bar or bars in such a manner that if unobstructed they will assume a vertical position, and combining such bars with suitable automatic mechanism, which loads and unloads said bars during the passage of the elevator cage or platform, to hold said bars down or allow them to rise slowly, and in details of construction, all of which are fully set forth in the following specification, and shown in the accompanying drawings, which form part thereof.

The object of my invention is to provide suitable automatic mechanism to operate the hatch-gate, but in such a manner that it shall not be raised suddenly in opposition to an opposing force. As heretofore constructed the gates were raised suddenly by the weight or elevating-power of the descending or ascending cage or platform, and were thus liable to injure persons in close proximity to the bars. With my improved construction a person sitting on the bars would not be injured or even interfered with while the cage ascends and descends.

Figure 1:
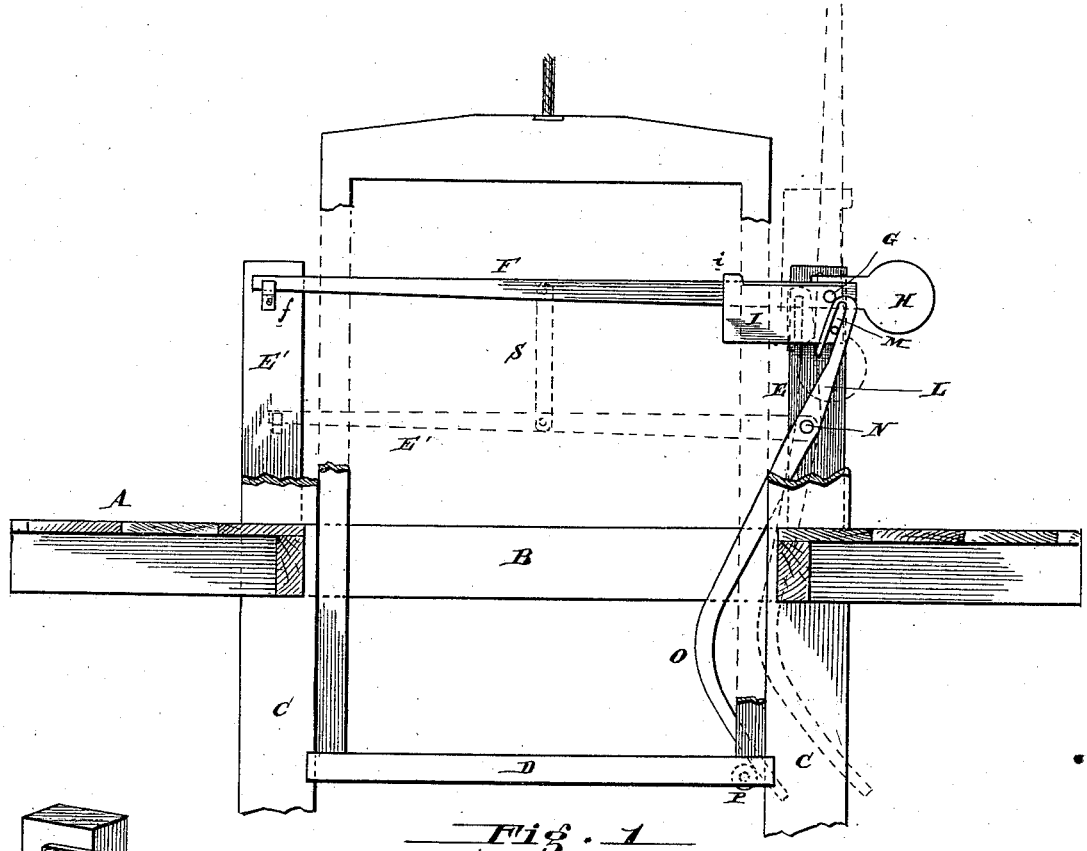
Figure 2:
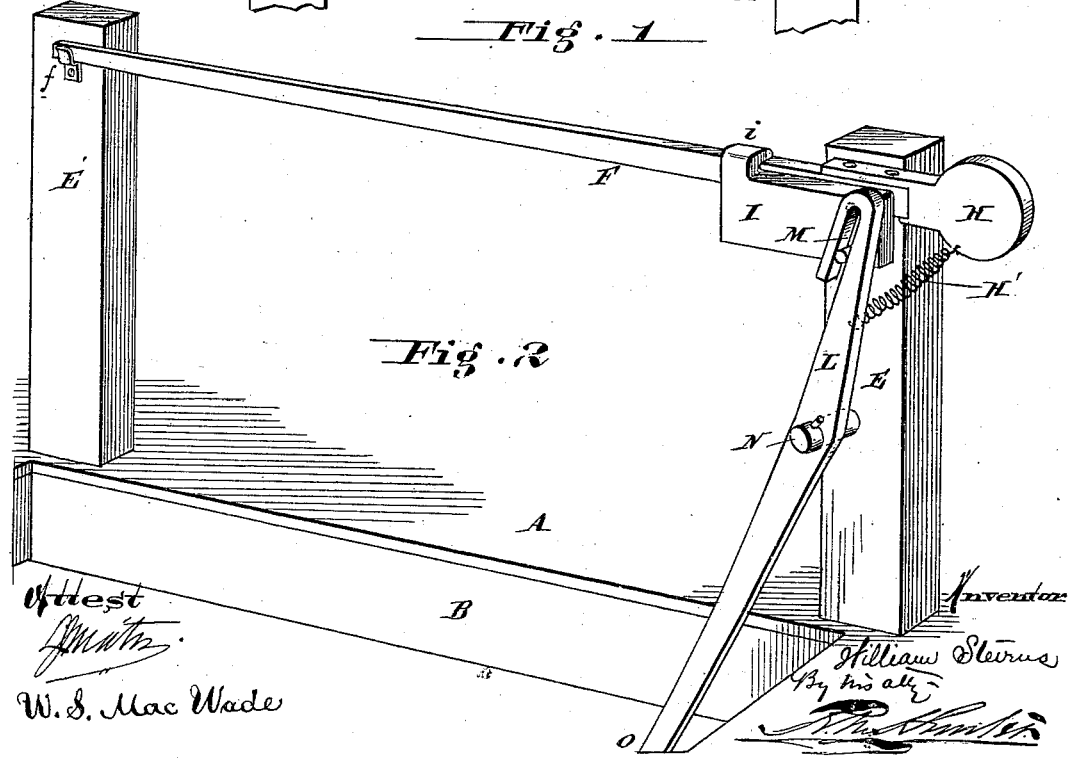

In the drawings, Figure 1 is a sectional elevation of a part of an elevator embodying my improvements. Fig. 2 is a perspective view of the gate-actuating mechanism.

A represents the floor, B the hatchway, C C the guideways, and D the elevator cage or platform. Part of the cage and guideways are shown in dotted lines, so as to expose the gate mechanism.

E E' are two vertical posts, arranged one at each corner of the entering side to the hatchway. To the upper part of post E is pivoted, at G, the bar F, which, when down, has its free end resting in support *f* on the post E'. This bar F is counterbalanced by a weight, H, so as to raise it if not otherwise prevented. In place of a weight, H, a spring, H', may be used; but I prefer the former. Also pivoted at G is a weight, I, the said pivot-point being close to one end, the other end being provided with a lug, *i*, or its equivalent, whereby it is supported upon the bar F, and thus tends to keep said bar down. The said weight is provided with a pin, K, below its pivot-point G, which is adapted to work in a slot, M, on the upper end of the lever L, pivoted to the post E at N, and provided on its lower end with a double cam-face, O. The cage or platform D carries a roller, P, which strikes the said cam-faces of the lever L and causes it to oscillate, thereby raising the weight I and swinging it upon its pivot G. As the weight I is removed from the bar F its weight H or spring H' causes it to follow after the weight I and assume the vertical position, as indicated by dotted lines in Fig. 1. By this means the weight I may be raised quickly while the bar F raises slowly, and in closing the weight I is somewhat counterbalanced by the weight H, and prevents too sudden closing of the gate. From this it is seen that the gate moves slowly in both directions and is incapable of causing any serious injury.

If desired, the gate may be made double by pivoting a second bar, R, at N, and connecting the two by a link, S, and, if desired, a gate may be arranged upon each side of the hatchway.

I do not limit myself to the exact construction shown, as it may be modified in various ways without departing from my invention.

Having now described my invention, what I claim as new, and desire to secure by Letters Patent, is—

1. In an automatic gate for elevator-hatchways, bars provided with means to raise said bars when unobstructed, in combination with means to hold them down or release them, the said means being controlled by the elevator-cage, substantially as and for the purpose specified.

2. In an automatic gate for elevator-hatchways, the pivoted gate-bars, in combination with means to cause them to rise when unobstructed, a weight or load controlled by the elevator cage or platform, and arranged to be supported upon said gate-bars to hold them down, or removed therefrom to allow them to rise, substantially as and for the purpose specified.

3. A pivoted counterbalanced hatch-gate, in combination with a movable load, and means controlled by the elevator-cage to place said load upon the gate or remove it therefrom, substantially as and for the purpose specified.

4. The combination of elevator-guideways C, hatchway B, cage D, having roller P, gate-bar F, having weight H or its equivalent, weight I, and lever L, having cam-faces O, substantially as and for the purpose specified.

In testimony of which invention I hereunto set my hand.

WM. STEVENS.

Witnesses:
    R. M. HUNTER,
    R. S. CHILD, Jr.